INVENTORS
ROBERT F. McCAFFERTY
GERALD D. RIGGLE
BY
ATTORNEYS

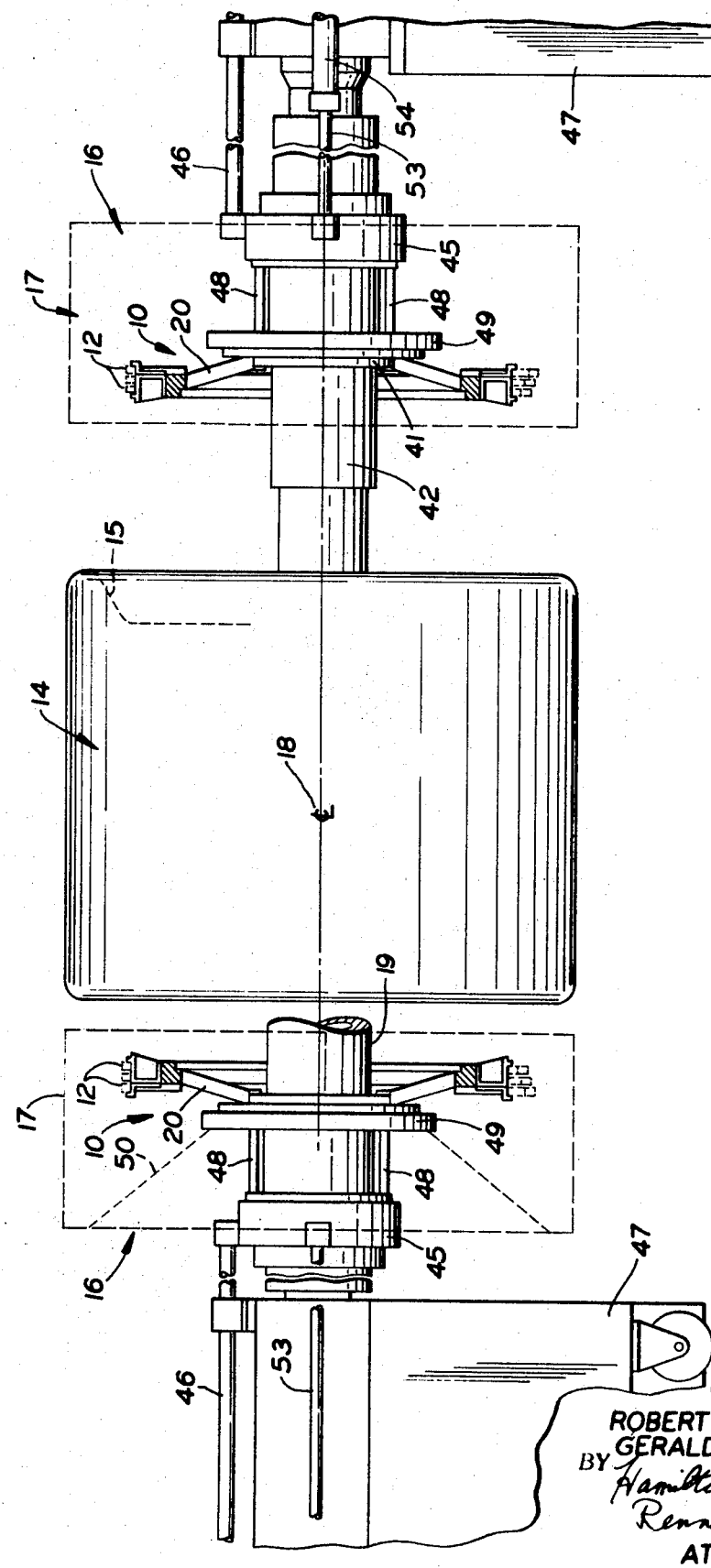

United States Patent Office 3,690,989
Patented Sept. 12, 1972

3,690,989
TIRE BEAD HANDLING APPARATUS
Robert F. McCafferty, Akron, and Gerald D. Riggle, Stow, Ohio, assignors to Akron Standard, division of Eagle-Picher Industries, Inc., Cincinnati, Ohio
Filed May 6, 1970, Ser. No. 35,093
Int. Cl. B29h 17/22
U.S. Cl. 156—403                    2 Claims

ABSTRACT OF THE DISCLOSURE

Apparatus for handling large diameter bead wire bundles for placement on a tire building drum. Apparatus is associated with the building drum and provides automatic adjustment for reasonable variations in bead diameter and a positive adjustable bead setting pressure (up to a magnitude of 3000 lbs. per bead).

BACKGROUND OF THE INVENTION

The present invention relates to the efficient and precise handling of "tire beads" during the operations of "building" an unvulcanized tire on a "building drum." A "tire bead" is an annularly continuous bundle of strands or filaments, usually metal wire, which are made up remote from the "building drum" in bead wire bundles. The "building" or construction of an unvulcanized tire requires exact positioning or placing of the bead wire bundles in relation to each other and to other components of the tire, including laminate layers of tire fabric, stock or ply material. Although apparatus according to the invention may be used to set tire beads on any of several types of "building drum," all such building drums will have a generally cylindrical working surface rotating on an axis.

When building a tire having many laminate layers of tire fabric or plies and multiple beads, such as a heavy duty truck or off-the-road tire which may have eight or more plies and two or more bead wire bundles in each bead area, the heavy bead wire bundles are awkward or difficult to handle and may be dimensionally distorted after assembly and prior to setting. Restoring the dimensional stability and exact placement of the bead wire bundles in relation to sequentially applied laminate ply layers will permit smooth, symmetrical and tight wrapping of the bead wires when the lateral edges of the plies are turned up.

Heretofore, there has been no bead setting apparatus associated with the building drum and providing automatic adjustment for reasonable variations in bead diameter and a positive adjustable bead setting pressure (up to a magnitude of 3000 lbs. per bead).

SUMMARY OF THE INVENTION

The object of the invention is to provide apparatus which will efficiently and precisely handle tire beads during the operations of building an unvulcanized tire on a building drum. More particularly, the object is to provide apparatus associated with the building drum which will handle and exactly set bead wire bundles in relation to sequentially applied laminate ply layers on the building drum. Specifically, it is an object to provide apparatus which will provide automatic adjustment for reasonable variations in bead diameter and a positive adjustable bead setting pressure.

These and other objects of the invention, and the advantages thereof, will be apparent in view of the Description of a Preferred Embodiment as set forth below.

In general, apparatus according to the invention is associated with a three-part building drum having a medial portion and axially aligned end portions or ply rings. A bead setting apparatus has a body member with a hub portion adapted for attachment to an axially movable member which is part of the end portions and within the ply ring. The outer edge or perimeter of the body member has a radially outward facing annular chamber securely mounting an annular inflatable member. The inflatable member has a general configuration in cross-section of the letter "M" when not inflated and a radially outwardly directed actuating projection. The outer edge of the body member carries a series of radially movable segments. Each segment has a radially inward span extending transverse the annular chamber and a radially outward shelf or ledge for supporting one or more bead wire bundles. The annular inflatable member is selectively radially distended from within the annular chamber to define the maximum circumferential extent of a bead wire bundle on the segments. Concurrently, the body member is moved laterally toward the medial drum portion to set a bead wire bundle against a laminate ply layer on the building drum.

DESCRIPTION OF A PREFERRED EMBODIMENT

Figure 1:
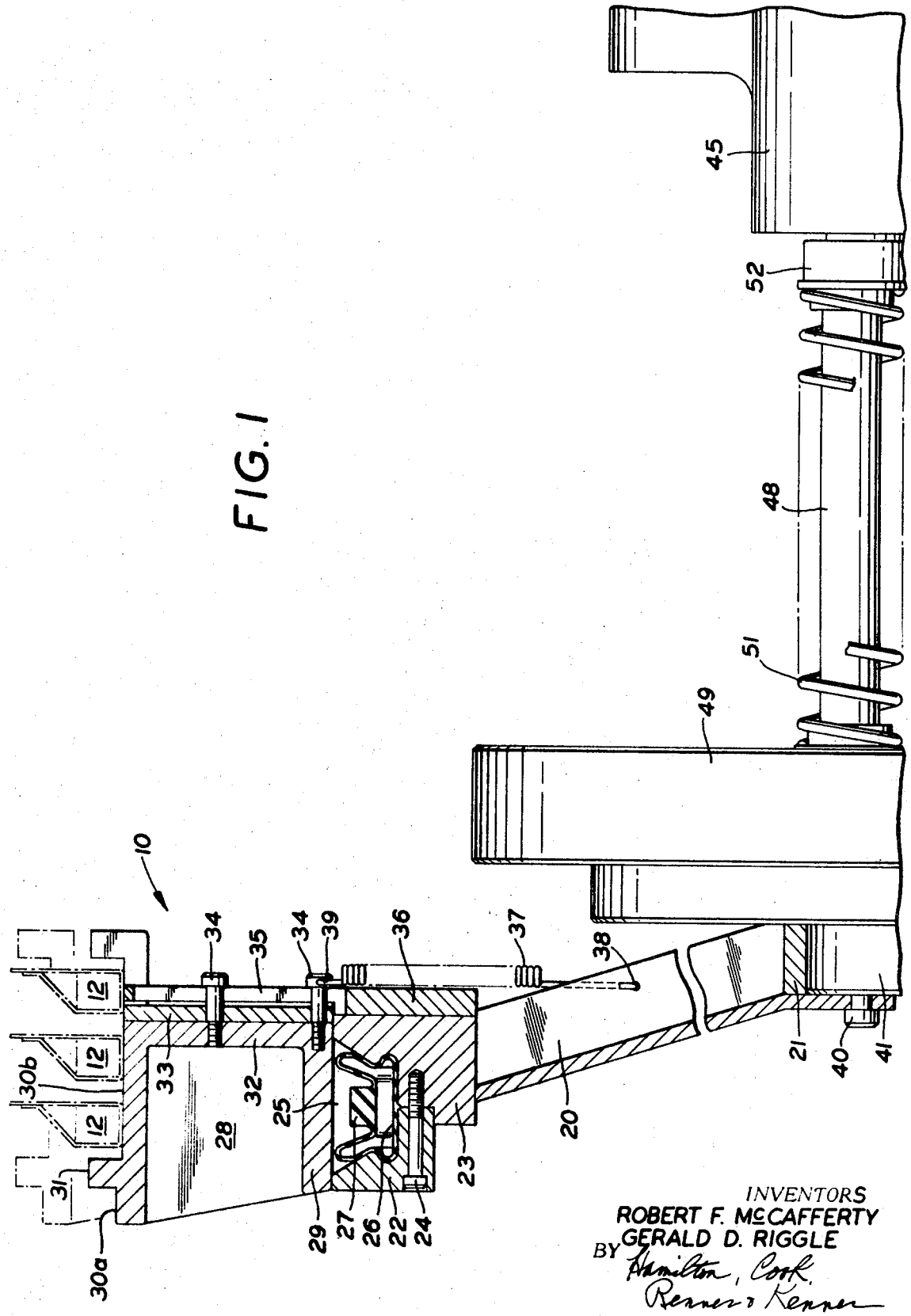
FIG. 1 is a fragmentary side view of apparatus for handling tire beads according to the invention.

A tire building bead setter according to the invention is indicated generally by the numeral 10. The bead setter 10 carries bead wire bundles 12 to a tire building machine (TBM) having a medial portion 14 with a generally cylindrical working surface and edge or ply turn down surfaces 15. The TBM has end portions 16 aligned axially with the medial portions 14 and carrying cylindrical ply rings 17 (shown in chain lines in FIG. 3). Each of the TBM portions rotates about a center line 18 defined by interlocking shafts 19.

As best shown in FIG. 1, the main structural component of a bead setter 10 is a body member 20 with an axial or hub portion 21 adapted for attachment to an axially movable member within an end portion 16, all as described in detail below. The outer edge or perimeter of the radially extending body member 20 has cooperating elements 22 and 23, secured together as by bolts 24, which define an annular recess or chamber 25. Securely mounted within chamber 25 is an annular inflatable member 26. As shown, the member 26 has a general configuration in cross-section of the letter "M" when not inflated with the additional characteristic of a radially directed actuating projection 27. When the member 26 is selectively inflated by fluid under pressure from a suitable source (not shown), the projection 27 will contact and move radially the segments 28 to be hereinafter described.

The body member 20 carries a series of (e.g., 8 or 12) uniformly spaced radially movable segments 28. Each segment 28 has a radially inward span or leg 29 extending transverse the annular chamber 25 and positioned for contact with radial projection 27 of the inflatable member 26. The radially outward portion of each segment 28 has a shelf or ledge (30) divided by a rib 31 into "working" and "storage" areas, 30a and 30b, for one or more bead wire bundles 12. The effective diameter of the area 30a is preferably slightly greater than the diameter of the area 30b so that during sequential operations of bead setting only the bead wire bundle on area 30a will be forcefully distended. The body portion 32 of each segment 28 may carry a slide plate 33 and is attached as by two radially oriented guide bolts 34 housed within a radial slot 35 in a carrier and guide member 36 mounted on the axially outer face of the element 23.

The annular inflatable member 26 is selectively radially distended from within the annular chamber 25 to define the maximum circumferential extent of a bead wire bundle 12 on the working ledge 30a of the segments 28. Thereafter, following setting of the bead against a fabric ply on the edge 15 of a drum 14 to be hereinafter described, the inflation pressure within member 26 is relieved or exhausted and the segments 28 are retracted by coiled springs 37 connected as at 38 to the body member 20 and as at 39 to the lower segment guide bolt 34.

Figure 2:
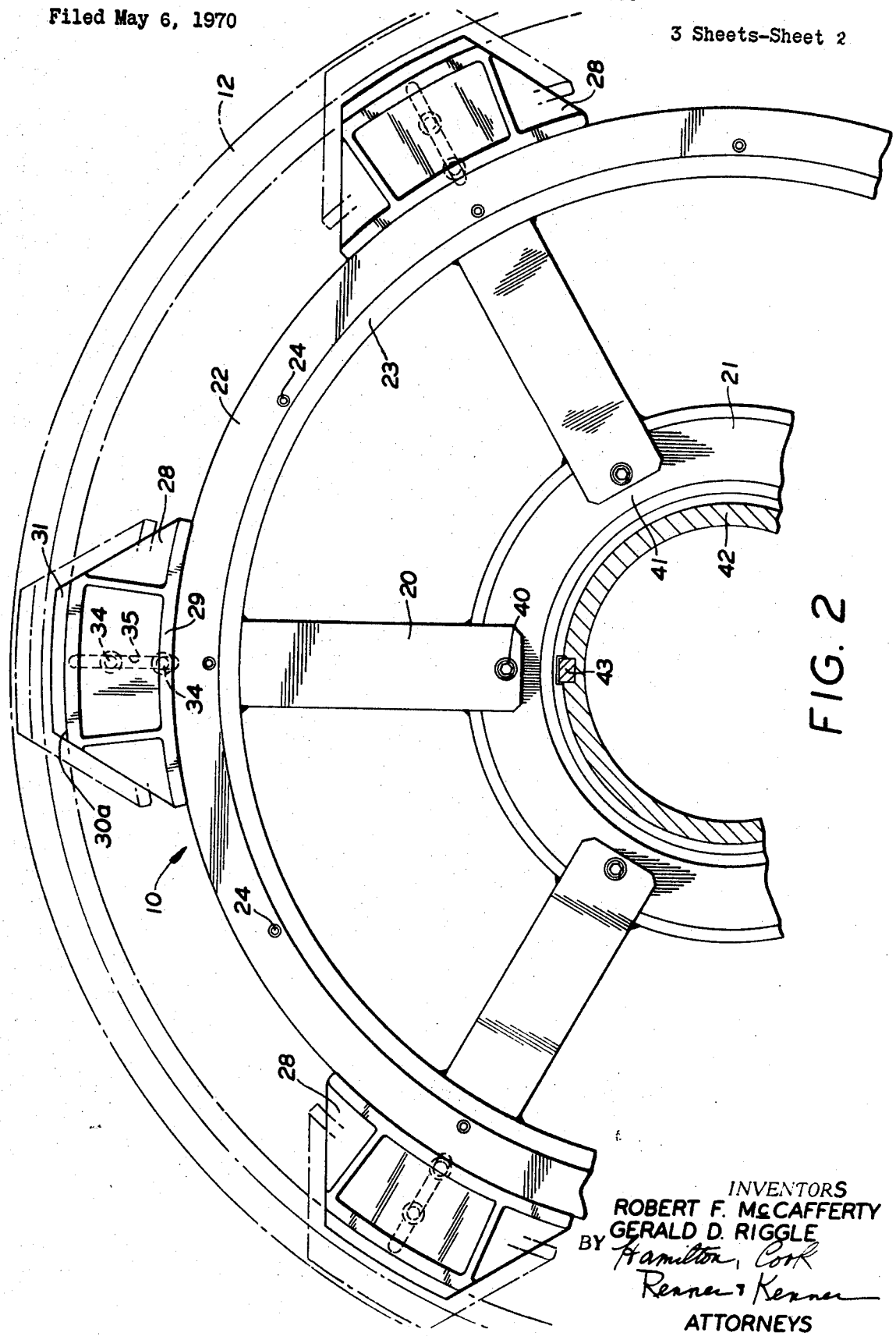
FIG. 2 is a fragmentary partially sectioned end view of the apparatus shown in FIG. 1; and, FIG. 3 is a schematic fragmentary side view of the apparatus according to the invention in association with elements within the end portions of a building drum.

The hub portion 21 of the bead setter body member 20 is mounted as by bolts 40 to a collar or ring 41 movable coaxially of a shaft 42 constituting the primary axial component of an end portion 16. The collar 41 is restrained from rotation relative to shaft 42 as by a key 43 (see FIG. 2). During the bead setting operation, the collar 41 is selectively moved relative to shaft 42 by a suitable actuator means 45.

As best shown in FIG. 3, the actuator means 45 may be an annular cylinder mounted coaxially of the shaft 42 as by guide rods 46 extending laterally from the base structure 47 of an end portion 16. The actuator means 45 is connected to the collar 41 as by guide rods 48 extending laterally through a collar or ring 49 for mounting the ply ring 17 radially of the shaft 42. The ply ring 17 is fixed to the collar 49 shown schematically in FIG. 3 as at 50. Each guide rod 48 carries a coil spring 51 extending between the collar 49 and a shoulder 52 on the guide rod thereby enabling the body member 20 to separate from collar 49 to place the beads in position on edge 15.

When the actuator 45 is selectively moved by piston rods 53 which are motivated by fluid under pressure in a cylinder 54 from a suitable source (not shown), the rods 48 will move laterally the collar 41. Thereafter, following setting of the bead against a fabric ply on the edge 15 of a drum 14, the actuation pressure against means 45 is relieved or exhausted and the collar 41 is withdrawn by the piston rod 53.

While a preferred embodiment of the invention has been shown and described, it should be apparent that various changes and modifications could be made without departing from the spirit of the invention. For example, the bead setter 10 could be adapted for movement laterally of the TBM end portions 16 as by electrically powered motors rather than a hydraulic actuator means 45. Therefore, the true spirit and scope of the invention should be determined solely by the appended claims.

We claim:

1. Apparatus (10) for handling bead wire bundles (12) during the operations of building an unvulcanized tire on a building machine (TBM) having a medial portion (14) with edge surfaces (15) and axially aligned end portions (16), said apparatus comprising a body member (20) attached to an axially movable member (41) within an end portion, the perimeter of said body member having an annular chamber (25), an annular inflatable member (26) securely mounted within said chamber, a series of radially movable segments (28) carried on the perimeter of said body member, each said segment having a radially inward span (29) transverse said annular chamber and a radially outward shelf (30) for supporting one or more bead wire bundles, and means to selectively radially distend said inflatable member from within said chamber to define the maximum circumferential extent of a bead wire bundle on said segments, said annular inflatable member having a general configuration in cross-section of the letter "M" when not inflated and a radially outwardly directed actuating projection (27) which will contact and move radially said segments.

2. Apparatus (10) for handling bead wire bundles (12) during the operation of building an unvulcanized tire on a building machine (TBM) having a medial portion (14) with edge surfaces (15) and axially aligned end portions (16), said apparatus comprising a body member (20) attached to an axially movable member (41) within an end portion, the perimeter of said body member having an annular chamber (25), an annular inflatable member (26) securely mounted within said chamber, a series of radially movable segments (28) carried on the perimeter of said body member, each said segment having a radially inward span (29) transverse said annular chamber and a radially outward shelf (30) for supporting one or more bead wire bundles, and means to selectively radially distend said inflatable member from within said chamber to define the maximum circumferential extent of a bead wire bundle on said segments, said shelf on the segments being divided by a rib (31) into a working area (30a) and a storage area (30b) the effective diameter of said working area being slightly greater than the diameter of said storage area.

References Cited
UNITED STATES PATENTS 2,754,885   9/1953   Jefferys _____ 156—403 X
1,777,405   10/1931  Frank _____ 156—403 UX STEPHEN C. BENTLEY, Primary Examiner